2,818,178
Patented Dec. 31, 1957

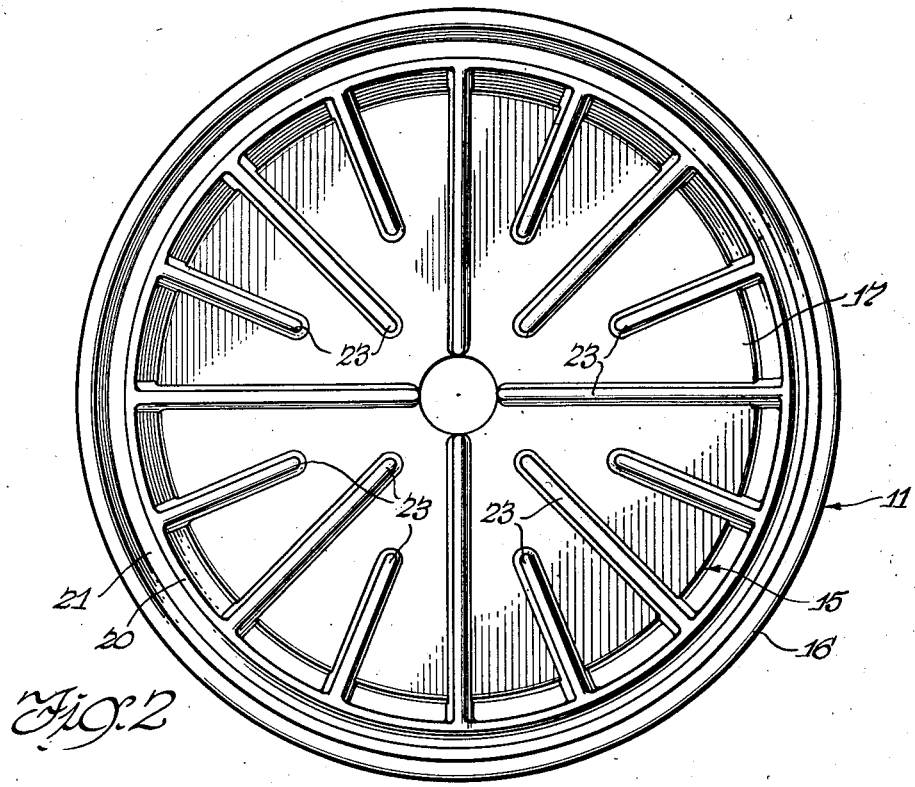
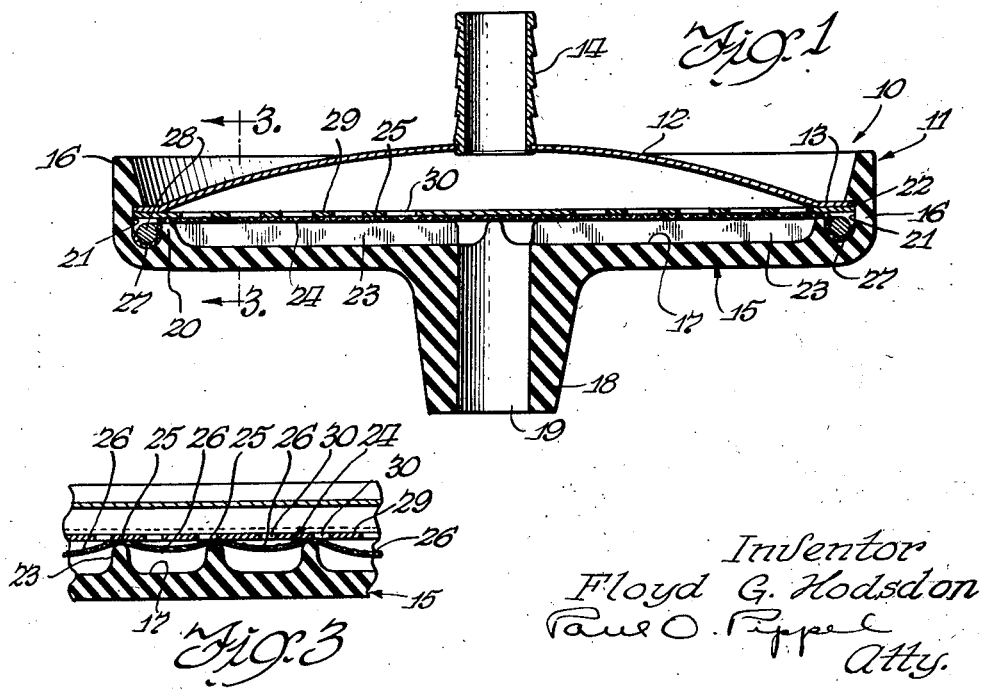

2,818,178

MILK STRAINER FOR PARLOR MILKERS

Floyd G. Hodsdon, La Grange, Ill., assignor to International Harvester Company, a corporation of New Jersey Application April 13, 1954, Serial No. 422,762

1 Claim. (Cl. 210—445)

This invention relates to an improved strainer assembly particularly adapted for connection to a pipe line. More specifically, this invention relates to a milk strainer especially adapted for the milk pipe line of a parlor milking system.

In order to effectively strain and filter the undesirable elements from whole milk as it leaves the animal, it has been found desirable to utilize flexible cloth-like filtering pads which have a relatively fine porous texture. The problem of using filtering pads of this type has been in providing suitable support for the strainer pad in order to keep the same from tearing, which would obviously result in inadequate filtering. Filtering assemblies, utilizing the flexible cloth-like pad, have heretofore used strainer plates between which the pad would be positioned. The strainer plates which were apertured would keep the filtering pad from tearing and would properly support the same. However, this type of support for the strainer pad has proved undesirable since the solid portions of the strainer plates would reduce the effective filtering area of the pad, inasmuch as milk would be strained only at the portions of the pad which are immediately below or above the apertures within the strainer plates. On the other hand, the elimination of one or both of the strainer plates would result in improper support so that the efficiency of the strainer pad would be very quickly lost.

It is a prime object of this invention to provide an improved strainer or filter assembly having improved supporting means for supporting a flexible filtering pad in such a manner that a maximum filtering area of the pad may be utilized.

Still another object is to provide an improved strainer assembly for use in connection with flexible filter pads, the assembly including a plurality of spaced supports adapted to engage and support portions of the filtering pad whereupon other portions of the pad are substantially unrestricted, thereby providing a maximum filtering area on the pad.

A still further object is to provide an improved filtering assembly, including an improved clamping means for effectively clamping the peripheral edge portions of a filtering pad in assembly.

These and other objects of the invention will become more readily apparent from a reading of the specification when examined in connection with the accompanying sheet of drawing.

In the drawing:

Figure 1 is a cross-sectional view, in elevation, of an improved strainer assembly;

Figure 2 is a plan view of a casing member of a filtering assembly; and

Figure 3 is a cross-sectional view through a filter, taken along the line 3—3 of Figure 1.

Referring particularly to Figure 1, a strainer or filter assembly is generally indicated by the reference character 10. The strainer 10 comprises a casing 11 having an upper dish-shaped casing member 12. The casing member 12 includes a flat annular peripheral edge 13 and an inlet connection 14 substantially centrally positioned.

A lower casing member of dish-shaped rubber material is generally indicated by the reference character 15. The casing member 15 includes an annular peripheral flange 16 extending laterally with respect to a strainer bottom 17. An outlet connection 18 is integrally formed with the lower casing member 15.

The casing member 15 is provided with an annular shoulder 20 containing an annular groove 21. The flange 16 is also provided with an annular undercut portion 22. A plurality of ribs 23 extend in a radial direction with respect to the outlet connection 18. A pad 24 of flexible cloth-like material is seated on the ribs 23. The pad 24 includes portions 25 directly in engagement with and supported on the ribs 23. The pad 24 also includes intermediate portions 26 which, as best shown in Figure 3, are laterally spaced in pocket-like formation below the upper edges of the ribs 23. The pad 24 includes a peripheral edge 27 which is positioned in the groove 20 in folded relation. A ring 28 of flexible material is wedged in the groove 20 to securely position and clamp the peripheral edge 27 in position. A strainer plate 29 is seated over the pad 24. The strainer plate 29 includes a plurality of openings 30 through which fluid to be filtered can flow from the inlet connection 14. As indicated, the flat annular peripheral edge 13 is disposed in clamped relation in the undercut portion 22, the resiliency of the lower casing member 15 serving to tightly maintain the filtering pad and the strainer plate in position. The strainer plate 29 securely clamps the portions 25 in engagement with the ribs 23.

The assembly can be assembled or disassembled by merely folding or distorting the flange 16 outwardly so that the casing member 12, strainer plate 29, and pad 24 can be easily removed. The pad 24 is maintained, however, in adequately supported position and during the flow of milk through the openings 30, the intermediate pad portions 26 are laterally spaced from the plate 29, as best indicated in Figure 3. Thus the effective filtering area of the pad is greatly increased, or stated in another manner, the greater area of the pad can be utilized than might be had if the intermediate portions 26 were seated flat or in contiguous relation with respect to the strainer plate.

Thus it can be seen that an effective strainer assembly has been provided which is particularly useful in connection with milk straining and filtering. A flexible pad can be utilized and proper support is provided therefor; the support, in effect, permitting to the fullest extent an adequate filtering area so that the milking operation and flow of milk is greatly expedited.

Thus the objects of the invention have been fully achieved, and it must be understood that changes and modifications may be made which do not depart from the spirit of the invention as disclosed or the scope thereof as defined in the appended claims.

What is claimed is:

A strainer assembly comprising first and second generally dish-shaped casing members, the first casing member being of a rubber-like material including an annular bottom having an opening and an outlet connection in communication with said opening, an annular peripherally extending flange integral with the outer periphery of said first casing member, said flange having an annular undercut portion on an inner side thereof, an annular groove formed in said first casing member adjacent said undercut portion, a plurality of radially extending integral ribs on said bottom, a flexible cloth-like filtering pad supported on said ribs, said pad having first portions engaging said ribs and second intermediate portions extending between said ribs, a peripheral edge portion on said pad being disposed in said annular groove, a flexible ring disposed in said groove over said edge portion for clamping the same in said groove, a reticulated strainer disk disposed over said flexible pad, an inlet connection on said second casing member disposed in registry with said outlet connection, said second casing member having an outer peripheral edge portion disposed in the undercut portion and resiliently clamped therein for clamping said disk, said disk being in contiguous engagement with a peripheral edge portion of the pad and tightly clamping the first portions of said pad against said ribs during the operating and non-operating conditions of said strainer, the second intermediate portions of the pad in the operating position being adapted to move away from the strainer disk in the direction of the fluid flow whereby the second intermediate portions provide a plurality of substantially unrestricted filtering areas.

References Cited in the file of this patent

UNITED STATES PATENTS

| | | |
|---|---|---|
| 353,724 | Whitaker | Dec. 7, 1886 |
| 1,695,306 | Wiemer | Dec. 18, 1928 |
| 2,483,000 | Brant | Sept. 27, 1949 |
| 2,516,102 | Brant | July 25, 1950 |
| 2,584,206 | Hodsdon | Feb. 5, 1952 |
| 2,665,009 | Harstick | Jan. 5, 1954 |